United States Patent [19]
Watanabe et al.

[11] Patent Number: 5,182,140
[45] Date of Patent: Jan. 26, 1993

[54] METHOD AND APPARATUS FOR LIQUID COATING FOR HONEYCOMB STRUCTURE

[75] Inventors: Tateshi Watanabe, Fuji; Tsunao Watanabe, Numazu; Tadashi Watanabe, Numazu; Hidetomo Matsugu, Numazu; Yasuhiro Yamanouchi, Numazu, all of Japan

[73] Assignee: N.E. Chemcat Corporation, Tokyo, Japan

[21] Appl. No.: 614,629

[22] Filed: Nov. 16, 1990

[30] Foreign Application Priority Data

Nov. 16, 1989 [JP] Japan .................................. 1-296127
Jun. 4, 1990 [JP] Japan .................................. 2-144418

[51] Int. Cl.⁵ .......................... B05D 7/22; B05D 5/00
[52] U.S. Cl. .................................. 427/230; 427/243; 427/244; 427/245; 427/348; 427/443.2
[58] Field of Search ................ 427/230, 243, 244, 245, 427/348, 443.2; 502/514

[56] References Cited

U.S. PATENT DOCUMENTS 4,208,454 6/1980 Reed et al. ...................... 427/238
4,550,034 10/1985 Shimrock ........................ 427/243

FOREIGN PATENT DOCUMENTS

0157651A3 10/1985 European Pat. Off. .
0202733A2 11/1986 European Pat. Off. .

*Primary Examiner*—Janyce Bell
*Attorney, Agent, or Firm*—Wenderoth, Lind & Ponack

[57] ABSTRACT

A liquid coating method for coating a liquid onto inner cells of a honeycomb structure includes the steps of supplying a liquid to the inside of a honeycomb structure vertically arranged from its lower part to cause the liquid to adhere to the inner cells therein, and supplying pressurized air to an upper part of the honeycomb structure to discharge the liquid within the inner cells. A holding apparatus for holding an article includes an outer cylinder in a form of a pipe having an inner wall with an inner diameter which allows an article to be held to pass therethrough easily and which has a sufficient strength, a resilient tube having an inner diameter which prevents the article to be held from passing therethrough under no tension and having ends each sealingly connected to the outer cylinder, thus defining together with the inner wall of the outer cylinder sealed space therebetween, means for discharging a fluid from the sealed space; and means for supplying the fluid to the sealed space.

3 Claims, 9 Drawing Sheets

METHOD AND APPARATUS FOR LIQUID COATING FOR HONEYCOMB STRUCTURE

FIELD OF THE INVENTION

The present invention relates to a method and apparatus for coating honeycomb structures. More particularly, the present invention relates to a coating method and a coating apparatus for causing a fluid such as a slurry to adhere to inner cells of honeycomb structures. for use, for example, in treating exhaust gas of cars. The present invention also relates to a holding method and a holding apparatus which can be used advantageously in the coating method and coating apparatus of the present invention.

BACKGROUND AND PRIOR ART OF THE INVENTION

For the treatment of exhaust gas from cars and the like, there has been known a method in which catalysts are carried in honeycomb structures made of metal or ceramics.

Various types of honeycomb structures have been proposed. For example, one of the known honeycomb structures has a large number of inner cells inside thereof which extend longitudinally along the length of the honeycomb structure and have open ends on both sides thereof. Another type of the known honeycomb structure also has a large number of longitudinally arranged cells inside thereof which have an open end on one side and a closed end on the other side thereof and, are arranged alternately so that every other adjacent cell has an open end (or a closed end) on one side and a closed end (or an open end) on the other side of the honeycomb structure and communicate with each other through holes in the walls of the cells.

In order to have catalyst components carried on the walls of the cells of the honeycomb structure of the above-described type in a suitable manner, it is necessary to coat various liquids including, among others, a slurry which contains catalyst components on the walls of the cells.

Examples of the liquids to be applied to the walls of the cells are as follows.

(a) Chemicals to be used in pretreatment of post-treatment in the production of catalysts, for example, acids, aqueous alkali solutions, and organic substances. These are aqueous solutions which contain no catalyst component.

(b) Aqueous solutions containing catalyst components such as aqueous solutions of palladium compounds, aqueous solutions of platinum compounds, and aqueous solutions of rhodium compounds.

(c) Slurries containing catalyst components and mainly composed of catalyst components such as platinum, palladium and rhodium, refractory metal oxides such as aluminum oxide and cerium oxide. The slurries may contain one or more of various metal compounds, acids, organic substances and the like. Generally, the slurries have a high viscosity (e.g., on the order of from 100 to 500 cps), a specific gravity of from 1.0 to 2.0 g/ml, and a component particle size of no greater than 10 μm.

(d) Slurries mainly composed of refractory metal oxides such as aluminum oxide and cerium oxide. The slurries may contain one or more of various metal compounds, acids, organic substances and the like. They contain no catalyst component represented by precious metals. Their physical characteristics are the same as the slurries described in (c) above.

As a coating method for applying the above-described various liquids to the walls of numerous cells in the honeycomb structure having the construction described above, a method has been used in which a honeycomb structure in a vertical position is dipped in a desired liquid contained in a storage tank, the honeycomb structure is then taken out from the liquid bath and left to stand as is for a while to extract or separate the liquid from the honeycomb structure by free fall of the liquid, and the liquid still remaining in the cells is removed forcibly by air-knife which blasts high-pressure air.

However, the conventional method has the following problems.

Firstly, it takes a considerably long time for the liquid to adhere all over the walls of the inner cells in the honeycomb structure, which makes it difficult to carry out the treatment efficiently. The cells have a considerably small sectional area and the pressure posed on the liquid while it rises within the cell is generated by the difference between the level of the liquid surface in the storage tank and that of the liquid surface in the cell. Hence, this pressure is not so high. In addition, usually the liquid to be coated has a high viscosity. Therefore, in the above-described method, the speed at which the liquid rises within the cells is not high enough.

Secondly, the amount of the liquid which adheres to the wall of the cells is not equal from cell to cell. Upon the separation of the liquid, the liquid is left to fall free followed by the removal of the liquid which is carried out by using an air-knife. As a result, it is often the case that a large amount of the liquid remains in some cells while only a small amount of the liquid remains in other cells, thus failing to cause the liquid to adhere to the honeycomb structure uniformly. It is desirable and important to uniformly distribute catalyst components and the like on the walls of the inner cells in the honeycomb structure because in the case of the treatment of exhaust gas, for example, the reaction occurs when the exhaust gas contacts the catalyst component on the honeycomb structure.

Thirdly, unnecessary liquid adheres to the side surface of the honeycomb structure. The right portion where liquid is to adhere is the walls of the inner cells in the honeycomb structure through which the exhaust gas passes, but it is unnecessary to allow the liquid to adhere on the side surface of the honeycomb structure. The liquid adhering on the side surface is of no use.

As described hereinbelow, in the liquid coating method and apparatus for the honeycomb structure of the present invention, a honeycomb structure, which is an article to be held, having a shape of a circular column, an elliptic column, a circular cylinder, an elliptic cylinder, or the like, must be held and the outer periphery of the article to be held must be covered partly or entirely.

For this purpose, a holder can be used which is composed of two halves, each having a shape of a longitudinally split circular cylinder provided with a recess or groove that defines an inner cavity having a contour corresponding to that of the article to be held when the halves are put together in close contact with each other.

However, if the size and shape of the article to be held, i.e., honeycomb structure, fluctuate, a problem arises that when the article to be held is relatively large, the holder is closed incompletely to fail to establish a complete seal, and on the other hand, when the article to be held is relatively small, it does not contact the holder closely, resulting in that the force of holding given by the holder is not strong enough.

A method and an apparatus might be considered useful in which articles to be held are held by using a rubber tube having an inner diameter sufficiently larger than the outer diameters of the articles to be held, and air is forcibly introduced into the tube to reduce its inner diameter to hold the articles in close contact therewith.

However, in the above-described apparatus, a problem arises that when air is introduced into the rubber tube, wrinkles tend to occur in the rubber from part to part, resulting in that the sealing of those parts with wrinkles is incomplete.

For example, when it is contemplated to coat a liquid on an inside surface of an article to be held having a shape of a circular cylinder and provided only inside thereof with one or more tubes extending in an axial direction, as honeycomb structure, the article to be held is held by a holder, a liquid tank is coupled with the lower end of the article, and a liquid is supplied from the liquid tank and forced to rise into the inside of the article to coat the liquid only on the inside thereof. In this case, the use of the conventional holder with a rubber tube results in the occurrence of wrinkles in the rubber as earlier explained, and the liquid forced upward flows upward between the article and the rubber tube via channels formed by the wrinkles and thus the liquid adheres also to the outside of the article, thus failing to achieve the purpose.

The conventional technique suffers from a problem that when the size and shape of the article to be held fluctuate more or less, it is difficult to hold the article certainly, and in addition the seal between the article and the holder is insufficient.

SUMMARY OF THE INVENTION

In order to solve the above-described problems, the present invention provides a liquid coating method for coating a liquid in inner cells in a honeycomb structure, comprising the steps of:

supplying a liquid to an inside of a honeycomb structure vertically arranged from its lower part to cause the liquid to adhere to the inner cells; and supplying pressurized air to an upper part of the honeycomb structure to discharge the liquid within the inner cells.

According to the method of the present invention, a liquid to be coated is introduced into the inside of a honeycomb structure arranged vertically from its lower part so that the liquid to be coated can adhere to the inner cells of the honeycomb structure. Then, pressurized air is supplied to the upper part of the honeycomb structure to discharge liquid which remains within the inner cells. Thus, the liquid is introduced forcibly from below and discharged or expelled by pressurized air. This makes it possible to cause the liquid to adhere speedily and uniformly without causing the liquid to adhere to the side surface of the honeycomb structure.

According to a preferred embodiment of the present invention, the above-described method comprises the steps of:

providing a liquid storage tank for storing a liquid to be coated, the liquid storage tank having an upper opening at its upper part and an air discharge outlet, and an air duct having a lower opening at its lower part;

connecting the upper opening of the liquid storage tank to a bottom of the honeycomb structure vertically arranged;

further connecting the lower opening of the air duct to a top of the honeycomb structure, and supplying the liquid to be coated from the liquid storage tank into the inner cells in the honeycomb structure to cause the liquid to adhere to the inner cells.

Further, according to another preferred embodiment of the present invention, the method comprises the steps of supplying pressurized air from the air duct to the upper part of the honeycomb structure and discharging the pressurized air from the air discharge outlet of the liquid storage tank to discharge the liquid in the cell.

As described above, according to the preferred embodiments of the present invention, a liquid storage tank having an upper opening and an air discharge outlet, and an air duct having a lower opening are provided. A honeycomb structure vertically arranged is connected at its bottom to the upper opening of the storage tank, and at its top to the lower opening of the air duct. The liquid to be coated is supplied from the liquid storage tank into the inner cells of the honeycomb structure. By doing so, the liquid to be coated is caused to adhere to the inner cells. Then, pressurized air is supplied to the upper part of the honeycomb structure from the air duct and the pressurized air is discharged from the air discharge outlet of the liquid storage tank so that the liquid within the cells can be discharged. As a result, the liquid can be caused to adhere to the inner cells speedily and uniformly, thus enabling coating treatment without causing the liquid to adhere to the side surface of the honeycomb structure.

Furthermore, in order to solve the above-described problems, the present invention provides a liquid coating apparatus for coating a liquid on walls of inner cells in a honeycomb structure, comprising:

a liquid storage tank for storing a liquid to be coated, the storage tank having an upper opening and an air discharge outlet;

an air duct for supplying an air stream, the air duct having a lower opening;

a first sealing element for sealingly connecting a bottom of the honeycomb structure to the upper opening of the liquid storage tank;

a second sealing element for sealingly connecting a top of the honeycomb structure to the lower opening of the air duct; and means for raising the liquid in the liquid storage tank through the upper opening and the inner cells in the honeycomb structure.

The liquid coating apparatus of the present invention includes a liquid storage tank for storing a liquid to be coated, which has an upper opening at its upper part and an air discharge outlet, and an air duct for supplying an air stream, which has a lower opening at its lower part. The bottom of the honeycomb structure is sealingly connected to the upper opening of the liquid storage tank by a first sealing element. On the other hand, the top of the honeycomb structure is sealingly connected to the lower part opening of the air duct by a second sealing element. The liquid in the liquid storage tank is raised by a device for raising the liquid through the upper opening and the inner cells in the honeycomb structure. On the other hand, pressurized air is supplied from the top of the honeycomb structure by the air duct. This construction makes it possible to cause the liquid to be coated to adhere speedily and uniformly to the target and thus carry out the coating treatment without causing the liquid to adhere to the side surface of the honeycomb structure.

In addition, in order to solve the above-described problems, the present invention provides a liquid coating apparatus for coating a liquid on walls of inner cells in a honeycomb structure, comprising:

a liquid storage tank having a first tank sealed from outside, and a second tank having an upper opening which is adapted to communicate with a bottom of a honeycomb structure and a communication opening which communicates with a lower part of the first tank; and an air supplier for supplying pressurized air to an upper part of the first tank.

The apparatus according to the above-described embodiment of the present invention includes a liquid storage tank which has first and second tanks. The first tank is sealed from the outside, and a second tank has an upper opening at its upper part. The air supplier supplies pressurized air to the upper part of the first tank. As a result, the liquid rises in the second tank and in the inside of the honeycomb structure. This construction makes it possible to cause the liquid to adhere speedily and uniformly and thus carry out the liquid coating without causing the liquid to adhere to the side surface of the honeycomb structure.

According to another embodiment, in order to solve the above-described problems, the present invention provides an apparatus for holding an article, comprising:

an outer cylinder in a form of a pipe having an inner wall with an inner diameter which allows an article to be held to pass therethrough easily and which has a sufficient strength;

a resilient tube having an inner diameter which prevents the article to be held from passing therethrough under no tension and having ends each sealingly connected to the outer cylinder, thus defining together with the inner wall of the outer cylinder a sealed space therebetween, means for discharging a fluid from the sealed space; and means for supplying the fluid to the sealed space.

Still further, in order to solve the above-described problems, the present invention provides a method for holding an article using a resilient tube, comprising the steps of:

forcibly increasing an inner diameter of a resilient tube, the inner diameter preventing an article to be held from passing therethrough under no tension by discharging fluid in a sealed space defined between the resilient tube and an outer cylinder outside the resilient tube, arranging the article in the resilient tube with increased inner diameter, and supplying the fluid to the space to decrease the inner diameter of the resilient tube to hold the article.

The method and apparatus for holding an article according to the present invention enable articles having a shape of a circular column, an elliptic column, a circular column, a circular cylinder or the like contour, such as a honeycomb structure, to be held particularly suitably. The articles to be held include solid articles such as columns and hollow ones such as cylinders with open ends, those having inside thereof one or more tubes extending axially. However, the outer shape and inner construction of the articles to be held are not limited to those described above, but those articles having square, triangular or the like shapes in cross section can also be held.

The outer cylinder is provided with a resilient tube as explained hereinbelow having an inner diameter which allows articles to be held or inserted therein. The outer cylinder may be have various cross-sectional shapes such as circular, elliptic, square and the like shapes in accordance with the cross-sectional shape of the article to be held.

The outer cylinder must have a sufficient strength for supporting the resilient tube.

The resilient tube may be made of, for example, natural rubber, synthetic rubber or the like. The resilient tube under no tension, i.e., in a relaxed state, has an inner diameter smaller than the outer shape or contour of the article to be held.

The resilient tube is arranged inside the outer cylinder, and both ends of the resilient tube are sealingly connected to the end surface, outer wall or inner wall of the outer cylinder so that a sealed space can be defined between the resilient tube and the inner wall of the outer cylinder.

The discharge means may be constructed, for example, by a vacuum pump, and a piping connecting the vacuum pump to the sealed space, and operates to discharge the fluid in the sealed space, for example, air or nitrogen.

The supply means may be constructed, for example, by a valve which controls the communication between the sealed space and the outside. The supply means applies, for example, the outside atmospheric pressure to the sealed space.

DETAILED DESCRIPTION OF THE PREFERRED EMBODIMENTS

Now, referring to the attached drawings, the coating apparatus and method according to preferred embodiments of the present invention will be described in greater detail hereinbelow.

While the embodiments described below relate to a coating apparatus and method for coating a slurry containing catalyst components onto a honeycomb structure having a shape of a circular cylinder, it will be apparent that various modifications or variations which are obvious to the skilled artisan may be made on the embodiments, if desired, to modify them to a coating apparatus and method for coating various liquids such as those described above onto honeycomb structures having various shapes and forms.

Figure 1:
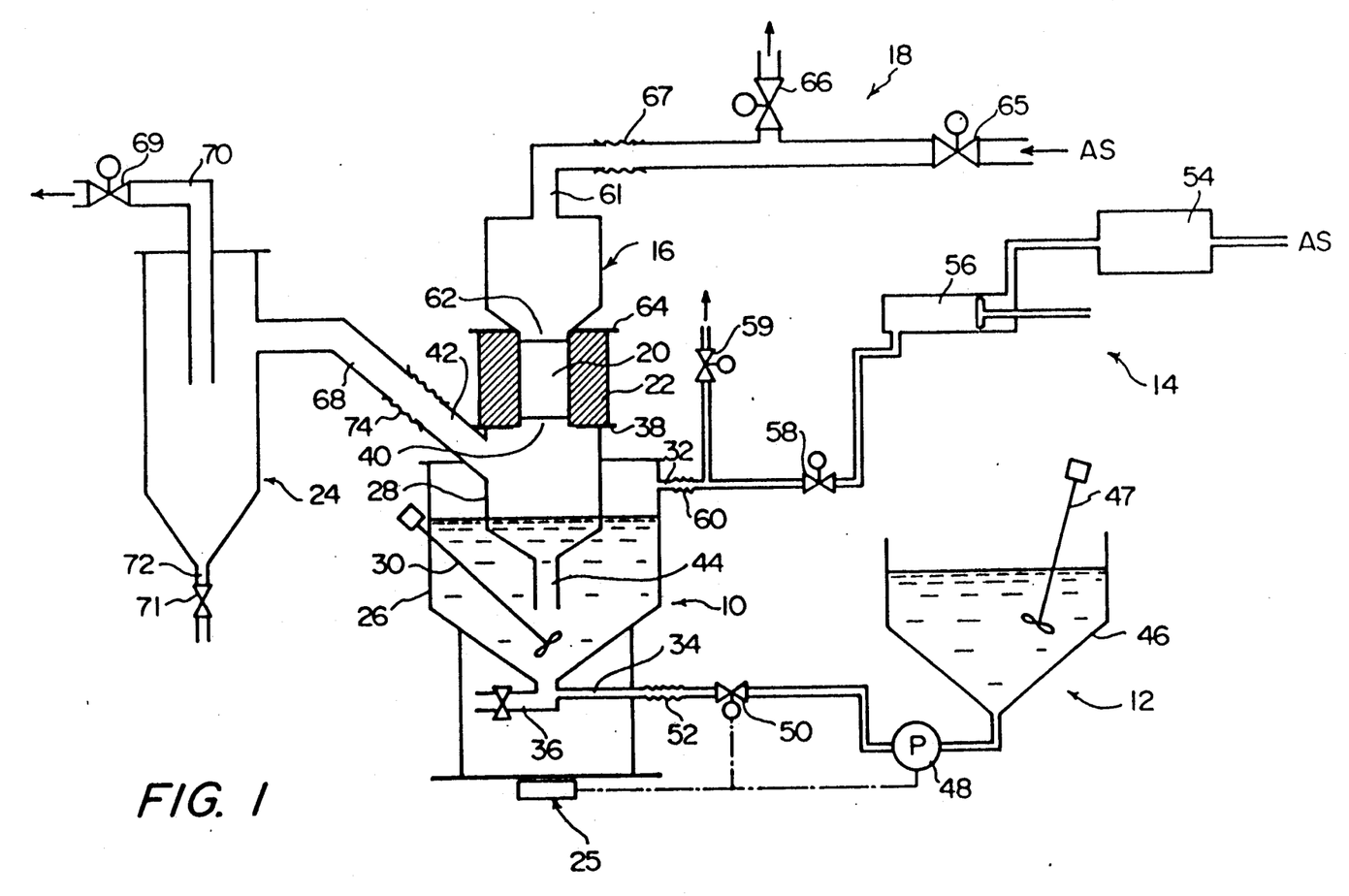
FIG. 1 is a schematic diagram of the liquid coating apparatus for the honeycomb structure according to a preferred embodiment of the present invention.

The coating apparatus for a honeycomb structure illustrated in FIG. 1 includes a liquid storage tank 10, a slurry storage device 12 from which a slurry is supplied to the liquid storage tank 10, an air supply device 14 which supplies pressurized air to the liquid storage tank 10, air duct 16, an air control device 18 which controls the supply of the pressurized air from a pressurized air source A to the air duct 16, a holding device 22 for sealingly supporting a honeycomb structure 20 between the liquid storage tank 10 and the air duct 16, a cyclone device 24, connected to the liquid storage tank 10, and a gravimetric device 25 for measuring the weight of, for example, the liquid storage tank 10 containing slurry therein.

The liquid storage tank 10 has a first tank, i.e., an outer tank 26, second tank, i.e., an inner tank 28, and a stirrer 30 for rendering uniform the density of the slurry in the outer tank 26, and retains a predetermined amount of the slurry therein.

The outer tank 26 has on its upper part an air supply port 32 which communicates to the air supply device 14. The upper part of the outer tank 26 is sealed from the outside so that air in the upper part of the outer tank 26 will not leak to the outside.

The outer tank 26 has on its lower part a slurry supply port 34 which communicates with the slurry supply device 12 and a discharge port 36 having a valve which is usually closed.

The inner tank 28 has on its upper part a horizontally extending upper wall 38 which defines an upper opening 40, and an air discharge port 42 which communicates with the cyclone device 24, and on its lower part a communication port 44 which communicates with the outer tank 26.

Because the liquid storage tank 10 has the above-described construction, the supply of a predetermined amount of pressurized air from the air supply device 14 to the liquid storage tank 10 through the air supply port 32 increases the pressure of the air in the upper part of the outer tank 26, which in turn increases the level of the slurry in the inner tank 28, resulting in that the slurry rises to a predetermined level above the upper end surface of the honeycomb structure 20 as described below. In order to supply a sufficient amount of the slurry from the outer tank 26 to the inner tank 28, the horizontal sectional area of the outer tank 26 is preferably sufficiently larger than the horizontal sectional area of the inner tank 28 and the communication port 44 of the inner tank 28 opens downward.

In this embodiment, the height to which the slurry is caused to rise depends on the amount of the slurry in the liquid storage tank 10 and the amount of the pressurized air supplied from the air supply device 12. For example, the level to which the liquid surface of the slurry has risen may be detected by providing a detector in the air duct 16. Alternatively, it is possible to supply a predetermined amount of the slurry, instead of the pressurized air, to the liquid storage tank 10 and determine the level to which the liquid surface of the slurry is caused to rise.

The slurry storage device 12 has a slurry tank 46 for storing the slurry, stirrer 47, a pump 48 and a control valve 50, and controls the amount of the slurry supplied from the slurry tank 46 to the liquid storage tank 10 by means of the pump 48 and the control valve 50.

The control valve 50 of the slurry supply device 12 and the slurry supply port 34 of the liquid storage tank 10 are connected to each other with a flexible tube 52.

It is preferred to construct the apparatus such that the pump 48 and the control valve 50 can be controlled by signals issued from the gravimetric device 25, for example, as described below in order for a given amount of the slurry to be retained before the coating operation starts.

The air supply device 14 has an air chamber 54 to which pressurized air is supplied from the pressurized air source A, an air pump 56 connected to the air chamber 54, a control valve 58, and exhaust valve 59 for discharging the air in the upper part of the outer tank 26 of the air duct 16.

The air pump 56 further pressurizes the pressurized air supplied from the air chamber 54 and supplies it to the control valve 58.

The control valve 58 is opened or closed by a control device (not shown) or manually. The control valve 58 and the exhaust valve 59 are connected to the air supply port of the liquid storage tank 10 through a flexible tube 60.

When the air pump 56 is actuated to open the control valve 58, the pressurized air is supplied from the control valve 58 to the upper part of the outer tank 26 through the air supply port 32. As a result, the slurry in the inner tank 28 is caused to rise as described above and rise further through the upper opening 40 of the liquid storage tank 10 and the inside of the honeycomb structure 20.

As another device for causing the slurry to rise, there can be used, for example, a pump for injecting the slurry to the liquid storage tank 10, or a device which includes a part of the outer wall of the liquid storage tank which is constructed by a flexible material capable of being deformed so as to reduce the inside volume of the liquid storage tank.

The air duct 16 is arranged above the liquid storage tank 10 and has an air inlet port 61 and a lower opening 62 arranged as opposing the upper opening 40 of the liquid storage tank 10. The air duct 16 has an inner space of a considerably large volume so that the air stream can be discharged from the lower opening 62 at a constant pressure.

The air duct 16 has also a horizontally extending flange-shaped lower wall 64 on the lower part thereof, which can move slightly up and down so that the holding device 22 can be arranged sealingly between the liquid storage tank 10 and the air duct 16.

The air control device 18 has a control valve 65 and an exhaust valve 66, and supplies pressurized air at a predetermined pressure at a predetermined timing to the air duct 16 by means of a control device (not shown) or manually to discharge the pressurized gas in the air duct 16. The air control device 18 may have a pressure control device (not shown) and an additional passage or channel (not shown) to the air duct 16, if desired, in order to supply a desired pressurized air to the air duct 16.

The exhaust valve 66 of the air control device 18 and the air inlet port 61 of the air duct 16 are connected to each other with a flexible tube 67.

Figure 2:
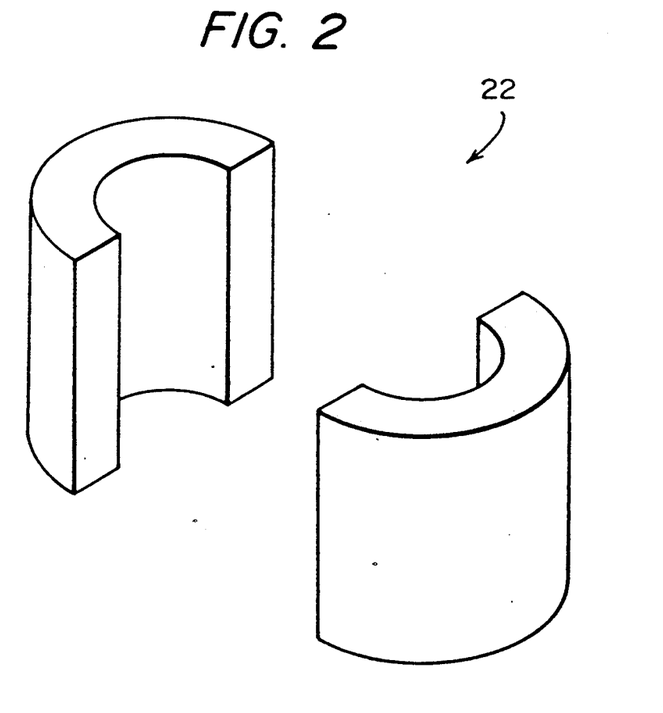
FIG. 2 is a schematic diagram of the holding apparatus used in the liquid coating apparatus illustrated in FIG. 1.

The holding device 22 has a shape of a circular cylinder having an inner hole of a circular column in shape. The holding device is composed of two splittable parts, or halves, as shown in FIG. 2. The two halves may be connected to each other with a connecting device (not shown) and arranged so that the inner side surface of the holding device 22 can closely contact the side surface of the honeycomb structure 20. Of course, the holding device 22 may be divided into three, four or more parts instead of two parts.

It is preferred that the holding device 22 be made of a material which is hard to deform and has resistance to chemicals, such as MC nylon. Further, the holding device 22 may be provided with a sheet of solid or porous, i.e., spongy rubber having a thickness on the order of from 1 to 5 mm on its upper surface, lower surface and inner side surface in order to increase its sealing ability.

The diameter of the inner hole of the holding device 22, i.e., the outer diameter of the honeycomb structure 20, is smaller than the diameter of the upper opening 40 of the liquid storage tank 10 and that of the lower opening 62 of the air duct 16. On the other hand, the outer diameter of the holding device 22, i.e., the diameter of the outer side wall, is larger than the diameter of the upper opening 40 of the liquid storage tank 10 and that of the lower opening 62 of the air duct 16. Because of this construction, when the slurry is urged upward to above the liquid storage tank 10, the slurry comes to rise through all the cells in the honeycomb structure 20. Alternatively, the slurry can be caused to rise through all the cells in the honeycomb structure 20 even when the outer diameter of the honeycomb structure 20 is larger than the diameter of the upper opening 40 of the liquid storage tank 10 and that of the lower opening 62 of the air duct 16, if the honeycomb structure 20 is supported in a mid position of the holding device 22, for example, using the holding device 22 of a large height instead of using the above-described construction.

The holding device 22 is arranged so that its inner side surface can closely contact the side surface of the honeycomb structure 20, and the holding device 22 thus arranged is positioned between the liquid storage tank 10 and the air duct 16 after raising the air duct 16 to some extent. Then, by lowering the air duct 16, the honeycomb structure 20 is set to the position as illustrated in FIG. 1. In this position, the lower surface of the holding device 22 sealingly contacts the upper wall 38 of the liquid storage tank 10, and the upper surface of the holding device 22 sealingly contacts the lower wall 64 of the air duct 16. The inner side surface of the holding device 22 sealingly contacts the side surface of the honeycomb structure 22. With this construction, when the slurry is pushed up to above the liquid storage tank 10, the slurry rises through the inner cells of the honeycomb structure 20 without causing leakage of the slurry to the outside between the lower surface of the holding device 22 and the upper wall 38 of the liquid storage tank 10 as well as between the upper surface of the holding device 22 and the lower wall 64 of the air duct 16, and without rising between the inner side surface of the holding device 22 and the side surface of the honeycomb structure 20.

As described above the holding device 22 includes the first sealing element for sealingly connecting the liquid storage tank 10 to the honeycomb structure 20, and the second element for sealingly connecting the air duct 16 to the honeycomb structure 20, integrally assembled with each other. These sealing elements may be of any type so far as they have the above-described function but are limited in no way to those illustrated in the attached drawings.

For example, it may be constructed such that the upper and lower sealing elements are connected to each other with a connection rod, with the upper sealing element sealingly contacting the lower wall 64 of the air duct 16 and the side surface of the honeycomb structure 20, and on the other hand, the lower sealing element sealingly contacting the upper wall 38 of the liquid storage tank 10 and the side surface of the honeycomb structure 20.

Alternatively, the upper and lower sealing elements may be supported by the lower wall 64 of the air duct 16 and the upper wall 38 of the liquid storage tank 10, respectively, without using the connection rod.

The cyclone device 24 has an air inlet port 68 connected to the air discharge port 42 of the liquid storage tank 10, a gas component discharge port 70 provided with a control valve 69, and a liquid component discharge port 72 provided with a control valve 71. The cyclone device 24 separates the pressurized air containing a liquid component such as slurry supplied from the air discharge port 42 of the liquid storage tank 10 into gas components and liquid components, and discharges them through the gas component discharge port 70 and the liquid component discharge port 72, respectively.

The air inlet port 68 of the cyclone device 24 and the air discharge port 42 of the liquid storage tank 10 are connected to each other with a flexible tube 74.

The gravimetric device 25 is provided under the liquid storage tank 10, and measures the total weight of the liquid storage tank 10 itself and of the slurry contained therein. From this, the amount of the slurry in the liquid storage tank 10 can be known. That is, as described earlier, the control valve 50 of the slurry storage device 12 and the slurry supply port 34 of the liquid storage tank 10 are connected to each other with the flexible tube 52; the control valve 58 and the exhaust valve of the air supply device 14 are connected to the air supply port 32 of the liquid storage tank 10 with the flexible tube 60; and further, the air inlet port 68 of the cyclone device 24 is connected to the air discharge port 42 of the liquid storage tank 10 with the flexible tube 74; hence the weight of the liquid storage tank 10 itself and the weight of the slurry in the tank 10 are posed on the gravimetric device 25.

Before starting the coating operation, the amount of the slurry in the liquid storage tank 10 is measured using the gravimetric device 25, and the pump 48 and the control valve 50 of the slurry storage device 12 are actuated in accordance with the measured amount to supply a predetermined amount of the slurry to the liquid storage tank 10 so that a constant amount of the slurry can always be retained in the liquid storage tank 10 before the coating operation starts.

Now, referring to FIGS. 3 to 6, the operation of the liquid coating apparatus illustrated in FIG. 1 is explained.

Figure 3:
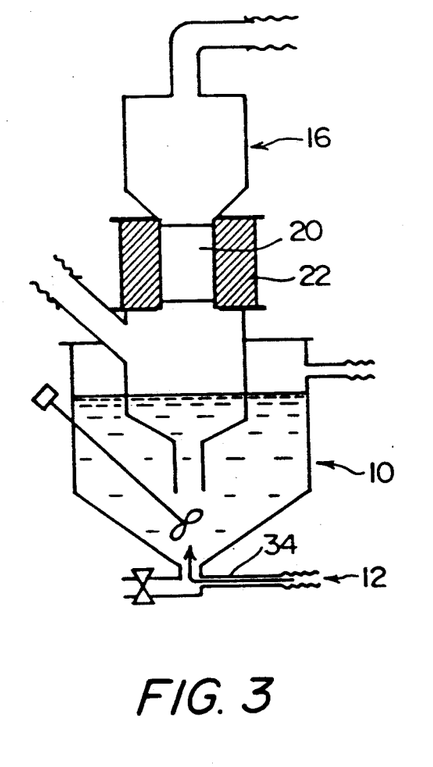
FIGS. 3 to 6 are each a schematic diagram illustrating the operation of the liquid coating apparatus illustrated in FIG. 1.
Figure 4:
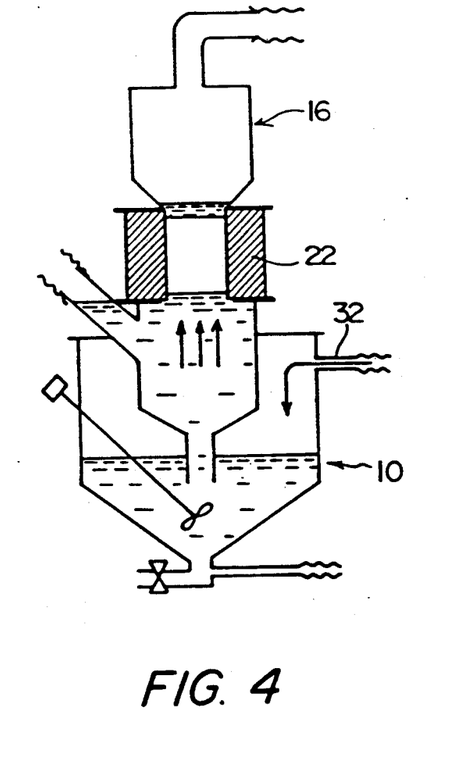

At first, the honeycomb structure 20 and the holding device 22 are sealingly arranged between the liquid storage tank 10 and the air duct 16 as illustrated in FIG. 3, and the amount of the slurry is measured by means of the gravimetric device 25, with replenishing the slurry from the slurry storage device 12 so that a predetermined amount of the slurry can be retained in the liquid storage tank 10, and then the control valve 50 of the slurry storage device 12 is closed (cf. FIG. 1).

Next, as illustrated in FIG. 3, a predetermined amount of pressurized air is supplied from the air supply device 14 to the upper part of the outer tank 26 through the air supply port 32 to lower the level of the liquid surface in the outer tank 26, to elevate the level of the liquid surface in the inner tank 28, and then adjust the level of the slurry to a position above the upper end surface of the honeycomb structure 20.

The pressure in the air duct 16 is retained substantially at atmospheric pressure by means of the exhaust valve 66 of the air control device 18, which causes the slurry to rise through the inner cells in the honeycomb structure 20 so that the level of the liquid surface can reach a position higher than the upper end surface of the honeycomb structure 20 when the pressurized air is supplied as described above.

After completion of the supply of the pressurized air from the air supply device 14 to the upper part of the outer tank 26, it is preferred to retain that state for a while, for example, for from 1 to 10 seconds. This is sometimes necessary, for example, in the case where the slurry has a high viscosity, the speed of slurry rising in the honeycomb structure 20 is low and thus it is necessary to await until the liquid surface reaches a position higher than the upper end surface of the honeycomb structure 20 completely.

The speed at which the slurry rises in the honeycomb structure 20 is preferably from 5 to 20 cm/sec. If this speed is too high, speeds at which the slurry rises in a great number of cells in the honeycomb structure differ from cell to cell, and therefore, there is a possibility that in some cells the coating treatment is performed in a state in which the slurry rises insufficiently. On the other hand, if the speed is too low, the efficiency of the coating operation is aggravated.

In order for the slurry to adhere to all of the plurality of cells in the honeycomb structure 20 all over the entire lengths of the respective cells, it is preferred to cause the slurry to rise so that the level of the liquid surface of the slurry can reach to a position higher, for example, by from 0.5 to 10 cm than the upper end surface of the honeycomb structure 20. This preferred height of the slurry varies depending on the density, length, shape and the like factors of the cells and generally higher density of the cells gives higher level of the liquid surface. Particularly preferred height is, for example, from 0.5 to 1 cm at a cell density of below 400 cell/inch$^2$, and from 1 to 3 cm at a cell density of 400 cell/inch$^2$.

Because all the valves of the cyclone device 24 (cf. FIG. 1) are closed, the level of the liquid surface at the air discharge port 42 does not rise so high.

Figure 5:
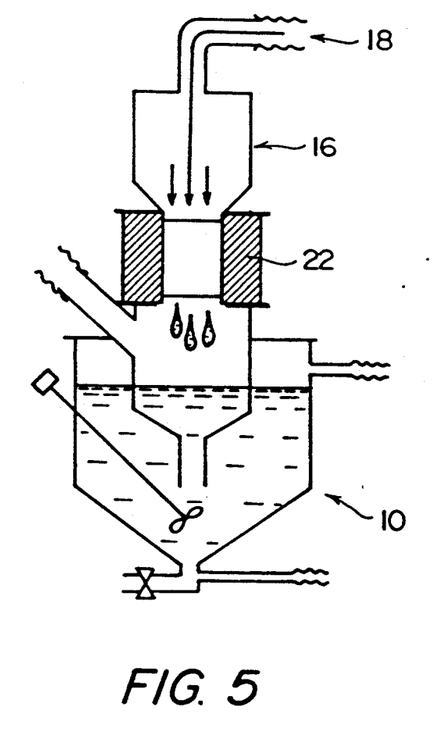

Next, the exhaust valve 59 of the air supply device 14 is opened, and then the control valve 69 of the cyclone device 24 (cf. FIG. 1), followed by supplying a small amount of pressurized air from the air control device 18 (cf. FIG. 1) to the air duct 16 as illustrated in FIG. 5 to discharge most of the slurry in the cells of the honeycomb structure 20.

Figure 6:
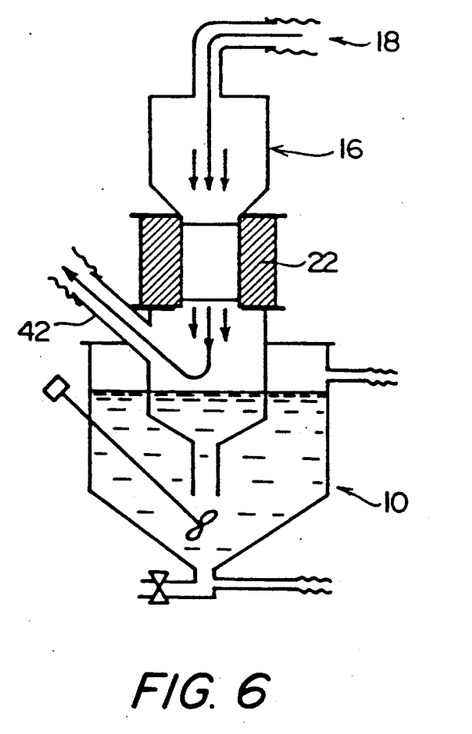

Then, as illustrated in FIG. 6, pressurized air is supplied from the air control device 18 (cf. FIG. 1) to the air duct 16 at an air flow of from 20 to 40 m$^3$/minute and at a pressure of from 0.2 to 1.0 kg/cm$^2$ to remove excessive slurry which adhered to the cells in the honeycomb structure 20 so that the clogging can be prevented which would otherwise occur at the lower part of the honeycomb structure 20. Particularly preferred pressure of pressurized air in the blowing step is from 0.3 to 0.6 kg/cm$^2$. The time of a single blowing operation is preferably from 0.3 to 1.0 second. The blowing is carried out preferably from 1 to 3 times.

The liquid coating method and apparatus for the honeycomb structure according to the present invention makes it possible to coat the inner cells in the honeycomb structure speedily and uniformly.

The liquid coating method and apparatus for honeycomb structure according to the present invention enables the coating of the inner cells in the honeycomb structure without causing the liquid to adhere to the side surface of the honeycomb structure.

Now, with reference to FIGS. 8 to 18b, the holding device which can be used advantageously as the holding device 22 in the above-described embodiment will be described hereinbelow.

Here is given an example of a pipe of a shape of an elliptic cylinder having a major axis of 15 cm and a minor axis of 10 cm, a length of 10 cm and a thickness of 5 mm.

The apparatus according to this embodiment has two main parts. One is an outer cylinder 81. The inner diameter of the outer cylinder 81 must be slightly larger than the outer diameter of the article to be held. In this embodiment, assuming that there is a fluctuation of $\pm 1$ cm in the size of the article to be held, it is desirable that the outer cylinder, in the case where it has a shape of an elliptic cylinder, have an inner diameter of no smaller than 17 cm for major axis, and no smaller than 12 cm for minor axis. If the outer cylinder has a shape of a circular cylinder, its inner diameter is desirably no smaller than 17 cm. If the inner diameter is not large enough, it is difficult to insert the article to be held therein. Further, in the case where the article to be held must be sealed all over its periphery, it is desirable that the outer cylinder has a length of no smaller than 21 cm. Because the holding device exhibits a weak adhesion on its ends, the cross section of the article to be held must be positioned sufficiently inside of the cross section of the outer cylinder of the holding device.

Another main part is a resilient tube 82, for example, a rubber tube. The inner circumference of the rubber tube 82 must be sufficiently smaller than the outer circumference of the article to be held. On this occasion, if the article to be held has a shape of an elliptic column or cylinder, it may sometimes be the case that complete sealing cannot be established depending on the shape of the rubber tube or direction in which the rubber tube is fitted. In this case, it is desirable that the inner diameter of the rubber tube is sufficiently smaller than the outer diameter of the article to be held. In this embodiment, the inner circumference of the rubber tube is desirably by at least 5 cm shorter than the outer circumference of the article to be held. Assuming that the shape of the rubber tube in cross section is elliptic, the inner diameter is desirably no larger than 13.7 cm for major axis and no larger than 8.7 cm for minor axis. The rubber tube is attached such that the major axis of the rubber tube is parallel to the major axis of the article to be held. On the other hand, if the shape of the rubber tube in cross section is circular, its inner diameter is desirably no larger than 8.7 cm. As for the length of the rubber tube, in this embodiment at least 31 cm is necessary because the rubber tube is folded toward the outer cylinder and fixed thereto by means of a metal band 83. However, the method of fixing the rubber tube is not limited to the above-described folding method. The rubber tube is preferably a tube made of, for example, natural rubber having a thickness of from 2 to 4 mm because it is excellent in resistance to wear, in contraction and expansion properties and in resistance to chemicals.

While in this embodiment an article having a shape of an elliptic cylinder has been exemplified as the article to be held, it is obvious to one skilled in the art that the article to be held which has a shape of a circular cylinder can similarly be held by the holding device having an outer cylinder having a shape of a circular cylinder provided with a rubber tube. Also, it is apparent that articles having a shape of an elliptic cylinder or column of which the major axis and the minor axis are not so different from each other, can be held by means of a holding device having an outer cylinder having a shape of a circular cylinder to which is attached a rubber tube.

Figure 8:
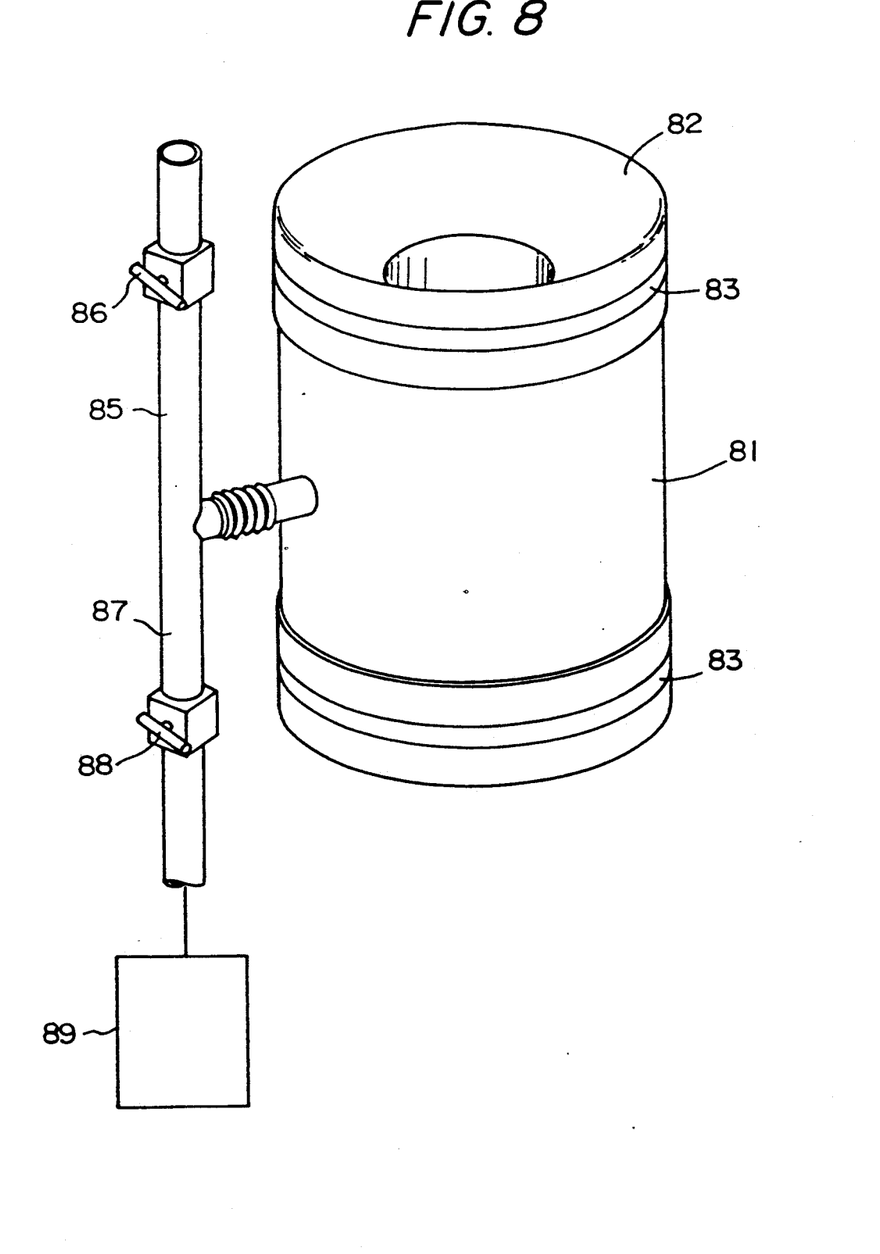
FIG. 8 is a perspective view of the holding apparatus using a resilient tube according to a preferred embodiment of the present invention.
Figure 9A:
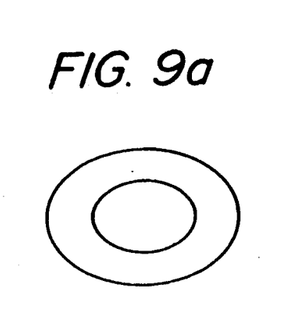
FIG. 9a is a plan view of the main parts of the apparatus illustrated in FIG. 8 before its operation starts.
Figure 9B:
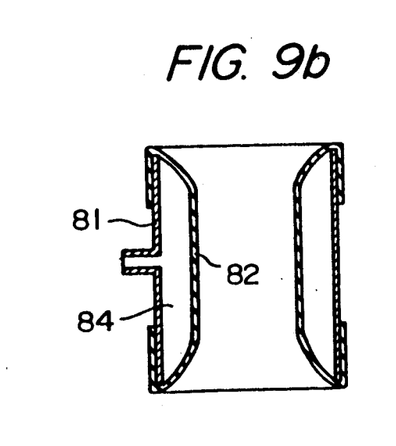
FIG. 9b is a central cross-sectional view of the apparatus illustrated in FIG. 1 before its operation starts.

As illustrated in FIG. 8, the upper and lower ends of the rubber tube 82 are sealingly connected to the outer cylinder with a metal band 83 to form sealed space 84 between the rubber tube 82 and the inner wall of the outer cylinder 81 (cf. FIG. 9b).

The sealed space 84 communicates with the outside through a pipe 85 and a first valve 86. Further, the sealed space 84 communicates through a pipe 87 and a second valve 88 with a vacuum pump 89.

The holding device according to this embodiment is actuated as follows.

Firstly, the vacuum pump 89 is not in action and, for example, the first valve 85 is open. In this state, the sealed space 84 communicates with the outside. The pressure in the inside of the sealed space is atmospheric pressure. As illustrated in FIGS. 9a and 9b, the diameter of the rubber tube 82 is small due to its elasticity, and the inner diameter of the rubber tube 82 is smaller than the outer diameter of the article to be held.

Figure 10A:
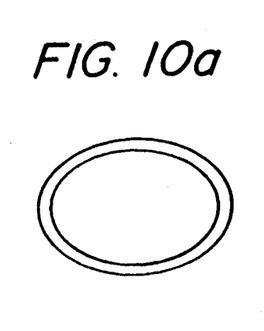
FIG. 10a is a plan view of the main parts of the apparatus illustrated in FIG. 8 in a state where the liquid in the sealed space has been discharged.
Figure 10B:
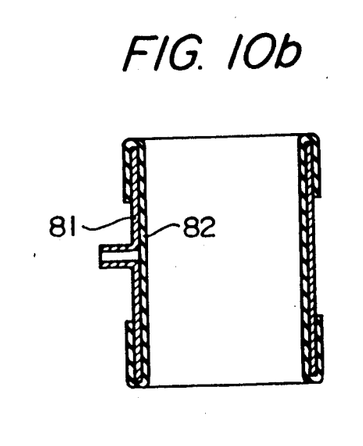
FIG. 10b is a central cross-sectional view of the apparatus illustrated in FIG. 8 in a state where the liquid in the sealed space has been discharged.

Next, the first valve 86 is closed, the second valve 88 is opened, and the vacuum pump 89 is actuated to discharge the air in the sealed space 84. The discharge of the air in the sealed space 84 increases the inner diameter of the rubber tube 82, resulting in that the rubber tube 82 contacts the inner wall of the outer cylinder 81 as illustrated in FIGS. 10a and 10b.

Figure 11A:
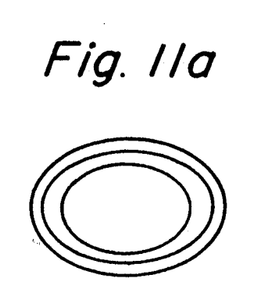
FIG. 11a is a plan view of the main parts of the apparatus illustrated in FIG. 8 in a state where the article to be held is arranged in the inside thereof.
Figure 11B:
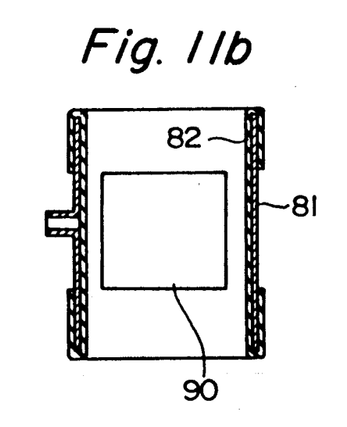
FIG. 11b is a central cross-sectional view of the apparatus illustrated in FIG. 8 in a state where the article to be held is arranged in the inside thereof.

Then, an article 90 to be held is arranged in the outer cylinder 81 and the rubber tube 82.

Figure 12A:
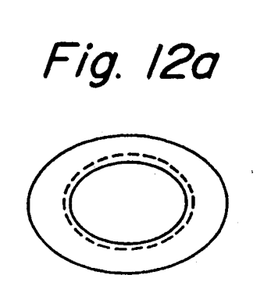
FIG. 12a is a plan view of the main parts of the apparatus illustrated in FIG. 8 in a state where atmospheric pressure has been applied to the sealed space.
Figure 12B:
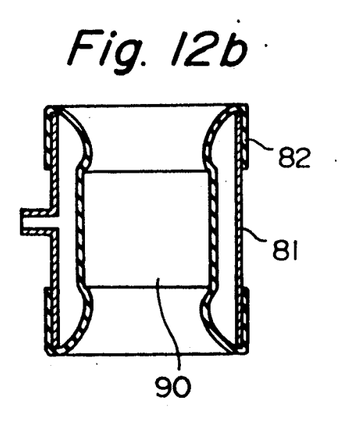
FIG. 12b is a central cross-sectional view of the apparatus illustrated in FIG. 8 in a state where atmospheric pressure has been applied to the sealed space.

Next, the actuation of the vacuum pump 89 is stopped, the second valve 88 is closed, and the first valve 86 is opened to make the pressure in the inside of the sealed space 84 equal to the atmospheric pressure, thus reducing the inner diameter of the rubber tube 82 so that the article to be held can be held due to the elasticity of the rubber tube 82 (cf. FIGS. 12a and 12b).

Figure 13A:
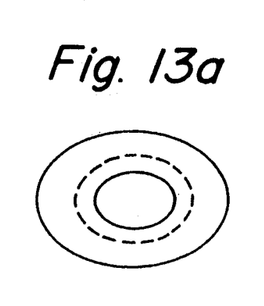
FIG. 13a is a plan view of the main parts of the apparatus illustrated in FIG. 8 in a state where pressurized air has been applied to the sealed space.
Figure 13B:
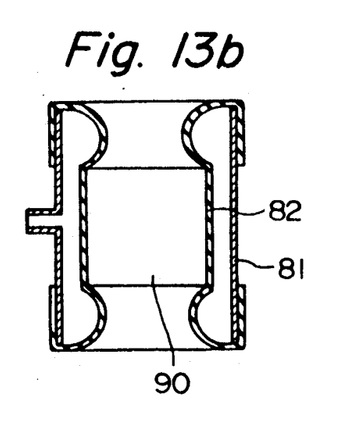
FIG. 13b is a central cross-sectional view of the apparatus illustrated in FIG. 8 in a state where pressurized air has been applied to the sealed space.

If desired, pressurized air supply means (not shown) may be connected to the first valve 86 and the pressure of the inside of the sealed space is made no lower than the atmospheric pressure to increase the holding force (cf. FIGS. 13a and 13b).

In order to release the holding, the pressure in the inside of the sealed space 84 may be decreased by using the vacuum means 89 and actuating it in reversed order of procedures in the embodiment illustrated in FIGS. 8 to 13, the outer cylinder has a shape of an ellipse in cross section, and when the pressure in the inside of the sealed space 84 formed between the resilient tube 82 and the outer cylinder 81 is atmospheric pressure, the resilient tube 82 is connected to the outer cylinder 81 so that the central hole in the resilient tube 82 can be of a shape of an ellipse as illustrated in FIG. 9a.

Figure 14A:
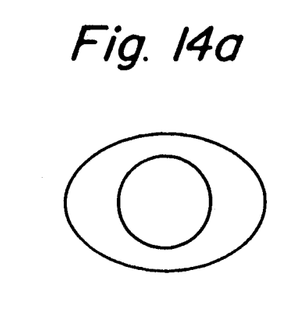
FIG. 14a is a plan view of the main parts of the holding apparatus according to a variation of the present invention in which the outer cylinder has an elliptic cross section and the resilient tube has a circular cross section.
Figure 14B:
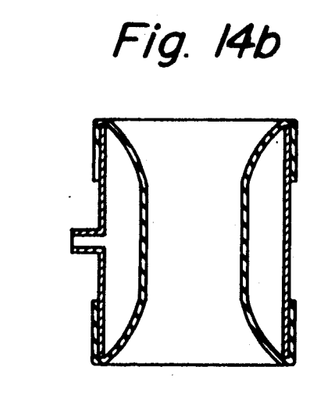
FIG. 14b is a central cross-sectional view of the holding apparatus according to a variation of the present invention in which the outer cylinder has an elliptic cross section and the resilient tube has a circular cross section.
Figure 15A:
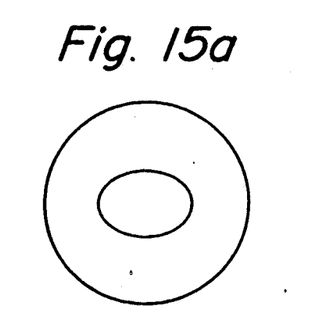
FIG. 15a is a plan view of the main parts of the holding apparatus according to another variation of the present invention in which the outer cylinder has a circular cross section and the resilient tube has an elliptic cross section.
Figure 15B:
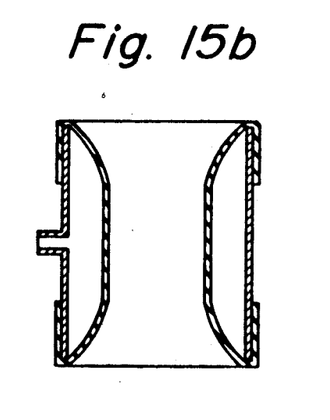
FIG. 15b is a central cross-sectional view of the holding apparatus according to another variation of the present invention in which the outer cylinder has a circular cross section and the resilient tube has an elliptic cross section.
Figure 16A:
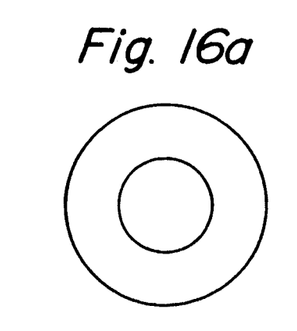
FIG. 16a a plan view of the main parts of the holding apparatus according to still another variation of the present invention in which both the outer cylinder and resilient tube, respectively, have a circular cross section and the resilient tube has an elliptic cross section.
Figure 16B:
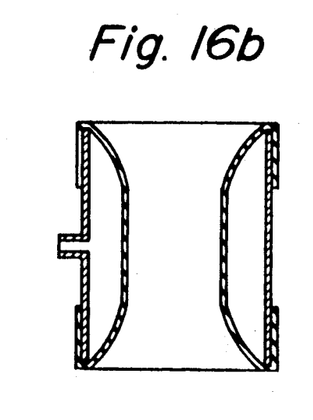
FIG. 16b is a central cross-sectional view of the holding apparatus according to still another variation of the present invention in which both the outer cylinder and resilient tube, respectively, have a circular cross section.
Figure 17A:
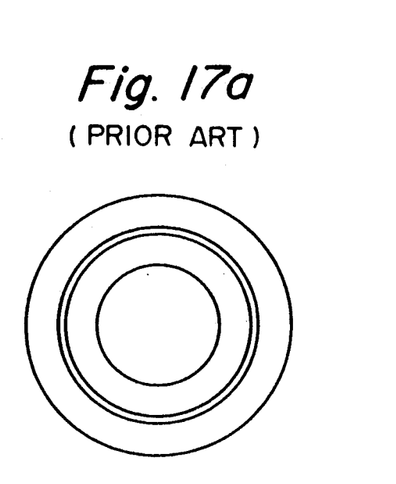
FIG. 17a is a plan view of the main parts of the conventional holding apparatus as comparison in a state where the article to be held has been arranged in the inside thereof.
Figures 17B, 18B:
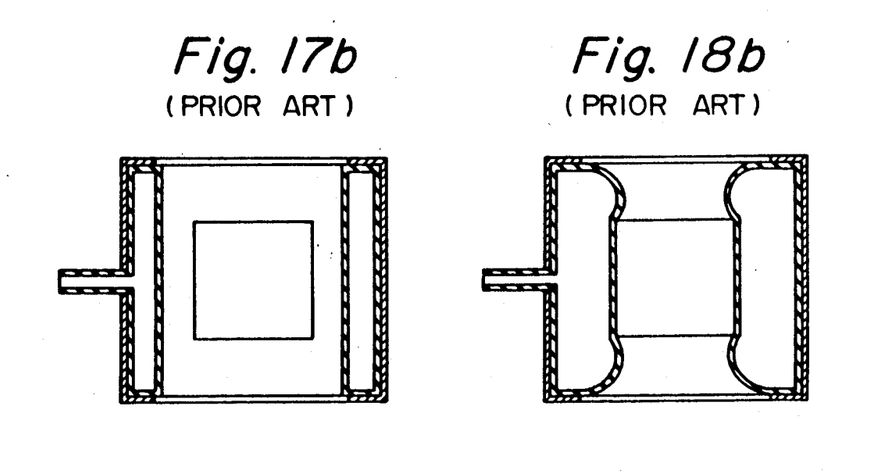
FIG. 17b is a central cross-sectional view of the conventional holding apparatus as comparison in a state where the article to be held has been arranged in the inside thereof.
FIG. 18b is a central cross-sectional view of the conventional holding apparatus as illustrated in FIG. 17b, showing the state of holding.
Figure 18A:
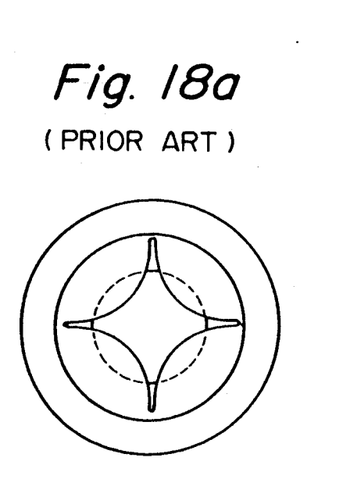
FIG. 18a is a plan view of the main parts of the conventional holding apparatus illustrated in FIG. 17a, showing the state of holding.

Instead of the above-described construction, in the variation illustrated in FIGS. 14a and 14b, the outer cylinder has a shape of an ellipse in cross section, and the resilient tube is connected to the outer cylinder so that the central hole in the resilient tube can form a circle. Further, in the variation illustrated in FIGS. 15a and 15b, the outer cylinder has a shape of a circle in cross section, and the resilient tube is connected to the outer cylinder so that the central hole in the resilient tube can form an ellipse. Still further, in the variation illustrated in FIGS. 16a and 16b, the outer cylinder has a shape of a circle in cross section, and the resilient tube is connected to the outer cylinder so that the central hole in the resilient tube can form a circle.

As illustrated in FIG. 8, in the case where the above-described holding device is used as a holding device for the liquid coating apparatus illustrated in FIG. 1 and the like, for example, the pipe 85 and the outer cylinder 81 are connected to each other with a flexible tube 82. In order to increase sealing performance of the sealing element between the lower part of the holding device and the upper wall 38 of the inner tank 28 (cf. FIG. 1), and the sealing element between the upper part of the holding device and the lower wall 64 of the air duct 16, a flange portion may be formed on each of the lower and upper parts of the holding device so that the flange portions can contact the upper wall 38 and the lower wall 64 through the rubber tube.

FIGS. 17a, 17b, 18a and 18b illustrate as a comparative example, among others, a conventional method in which air is forcibly introduced into a rubber tube having an inner diameter sufficiently larger than the outer diameter of the article to be held. In the conventional method, wrinkles occur usually at three or four places, thus indicating that complete sealing of the outer wall is difficult.

As described above, according to the holding apparatus and method of the present invention, articles having shapes and sizes with certain fluctuation can be held firmly.

Further, according to the holding apparatus and method of the present invention, the article to be held and the resilient tube in the holding device contact each other without causing wrinkles in the resilient tube, thus preventing the fluid, for example, a liquid for coating only the inside of the article to be held, from flowing in the axial direction between the article to be held and the resilient tube.

Because the resilient tube closely contacts the article to be held upon the holding, the liquid will not flow though between the article to be held and the resilient tube nor adhere to the outside surface of the article to be held when it is intended to coat the liquid only to the inside of the article to be held.

Furthermore, according to the present invention, no power is required during the holding, and even if the resilient tube is damaged, air piping is damaged or outfitted, the article to be held continues to be held. Therefore, the holding apparatus and method of the present invention are highly safe.

During the holding, power is unnecessary, which makes it possible to separate the holding device and move it. Therefore, the present invention gives much freedom in the designing of machinery.

As described above, the holding device of the present invention can be used advantageously as a sealing device in place of the holding device for use in the liquid coating apparatus according to the above-described embodiments.

EXAMPLES AND COMPARATIVE EXAMPLES

Example 1

A honeycomb structure was used which was made of a ceramics having a shape of a circular cylinder of a diameter of 93 mm and a height of 75 mm, having a cell density of 300 cells/inch$^2$.

As the liquid for coating, slurry was used which is composed mainly of platinum, aluminum oxide, cerium oxide, acetic acid, a defoaming agent and water. The specific density of the slurry was 1.55 g/ml. The solid content was 46.08%.

Using the apparatus exactly as illustrated in FIG. 1, the above-described honeycomb structure as described above was set between the liquid storage tank and the air duct using the holding device.

The amount of the slurry retained in the liquid storage tank and the amount of pressurized air to be supplied by the air supply device are adjusted so that the slurry was able to be pushed upward to a level of about 2 cm above the upper end surface of the honeycomb structure, and after retaining the system under these conditions for one second after completion of the supply of the pressurized air from the air supply device, pressurized air at a pressure of 3.7 kg/cm$^2$ was supplied into the air duct for 2 seconds to completely expel the slurry which remained in the cells. Thereafter, pressurized air at 0.37 kg/cm$^2$ was supplied into the air duct for 0.5 second, with interruption for 1 second, and again pressurized air at 0.37 kg/cm$^2$ was supplied into the air duct for 0.5 second.

Twenty honeycomb structures thus treated were measured for recording the amount of the slurry which adhered to the honeycomb structure and the time required for the coating.

The weight of the slurry which adhered to the honeycomb structure was on average 116.2 g, and as indicated in Table 1, fluctuation A of the amount of the slurry which adhered was 5.00% as 30%. The time T required for the operation was 25 seconds/number of article.

Comparative Example 1

The same honeycomb structure and slurry as used in Example 1 were used.

The honeycomb structure was completely dipped in the slurry charged in the storage tank, taken out from the slurry, and passed below air-knife jetting high-pressure air to blast off the slurry remaining in the cells.

Twenty honeycomb structures thus obtained were measured for recording the fluctuation A in the amount of the slurry which adhered to the honeycomb structure and the time T required for the coating. Table 1 shows the results.

Example 2

A honeycomb structure was used which was made of a ceramics having a shape of an ellipse in cross section of a major axis of 5.78 inch and a minor axis of 3.03 inch, a height of 2.25 inch, having a cell density of 400 cells/inch$^2$.

The coating was carried out with other conditions being the same as those in Example 1.

Twenty honeycomb structures thus obtained were measured for recording the fluctuation A in the amount of the slurry which adhered to the honeycomb structure and the time T required for the coating. Table 1 shows the results.

Comparative Example 2

The same honeycomb structure as used in Example 2 was coated in the same manner as in Comparative Example 1.

Twenty honeycomb structures thus obtained were measured for recording the fluctuation A in the amount of the slurry which adhered to the honeycomb structure and the time T required for the coating. Table 1 shows the results.

TABLE 1

|  | Fluctuation A | Time T*) | Adherence to Side Wall |
|---|---|---|---|
| Example 1 | 5.0% | 25 sec/n | No |
| Comparative Example | 7.3% | 100 sec/n | Yes |
| Example 2 | 3.3% | 25 sec/n | No |
| Comparative Example | 8.9% | 100 sec/n | Yes |

Note:
*)"sec/n" indicates seconds/number of article.

Example 3

A honeycomb structure was used which was made of a ceramics having a shape of an ellipse in cross section of a major axis of 3.03 inch and a minor axis of 2.25 inch, a height of 2.25 inch, having a cell density of 400 cells/inch$^2$.

The coating was carried out under the same conditions as in Example 1, and then calcined in an electric oven at 400° C. for 1 hour.

Then, Fluctuation B in the amount of the catalyst components carried on each part of the honeycomb structure was measured as follows.

Figure 7:
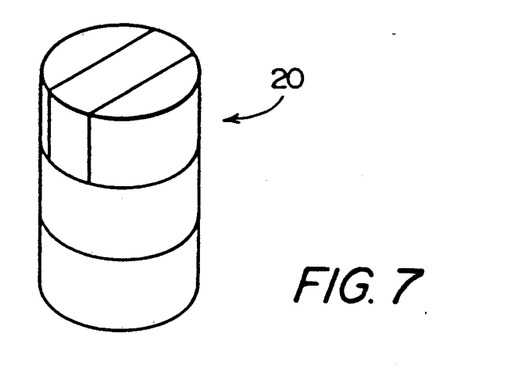
FIG. 7 is a schematic perspective view of the apparatus for measuring the fluctuation of value B measured in Example 3, showing the position at which value B is measured.

An upper ⅓ part of the honeycomb structure was divided into three parts so that a diameter is divided into three equal parts as illustrated in FIG. 7. The maximum value of the contents of catalyst component (% by weight) among the three parts was defined as $C_{MAX}$, the minimum as $C_{MIN}$, and an average of the whole values as $C_{AVE}$, then, the fluctuation B (%) of the amount of the catalyst component carried being represented by the following formula:

$$B = 100 \times (C_{MAX} - C_{MIN})/C_{AVE}$$

The fluctuation B measured as described is shown in Table 2.

Comparative Example 3

The same honeycomb structure as that in Example 3 was coated and calcined under the safe conditions as in Comparative Example 2; and then fluctuation B was measured as described above.

The fluctuation B measured as described above is shown in Table 2.

TABLE 2

|  | Fluctuation B |
|---|---|
| Example 3 | 1.8% |
| Comparative Example 3 | 14.0% |

Example 4

The same apparatus as illustrated in FIGS. 8 to 13b was used.

Upon the practice of the procedures, an elliptic cylinder made of stainless steel was used as the outer cylinder, which had an inner diameter of 170.0 mm for major axis and 130.0 mm for minor axis, and a height of 270.00 mm. The rubber tube 82 used was one made of natural rubber, having an inner diameter of 95.0 mm, a thickness of 3.0 mm, and a length of 370.0 mm. Two pipes 85 and 87 each provided with a valve were attached to the outer cylinder. One of the pipes was connected to the vacuum pump 89. As the article to be held, there was used a ceramics honeycomb of a shape of an elliptic column having an outer diameter of 143.0 mm for major axis and 98.0 mm for minor axis, and a height of 116.6 mm.

The section of the rubber tube 82 was expanded and the rubber tube 82 was set in the outer cylinder 81, and the folded portion was fixed to the outer cylinder 81 with the metal band 83.

The valve 86 for air release was closed, the valve 88 for the vacuum pump was opened, and the vacuum pump 89 was energized. As a result, the rubber tube 82 was expanded. On this occasion, a protrusion was provided around the air inlet port so that the inlet port could not be clogged.

The article to be held was inserted in the rubber tube in a direction such that the major axis of the outer cylinder was parallel with the major axis of the article to be held, the vacuum pump was stopped, the valve 86 for air release was opened. Then, the rubber tube contracted to hold the article.

Further, using the holding device of the above-described size, articles having an outer diameter of from 98.0 to 140.0 mm for major axis and from 98.0 to 100.0 mm for minor axis and the outer wall were able to be held under the conditions where the outer wall was completely sealed.

Example 5

Upon the practice of the procedures, a circular cylinder made of stainless steel was used as the outer cylinder, which had an inner diameter of 115.2 mm an outer diameter of 165.2 mm, and a height of 270.0 mm. As the rubber tube was used one made of natural rubber, having an inner diameter of 95.0 mm, a thickness of 3.0 mm, and a length of 370.0 mm. Two pipes each provided 85 and 87 with a valve were attached to the outer cylinder. One of the pipes was connected to the vacuum pump. As the article to be held, there was used a ceramics honeycomb of a shape of a circular cylinder having an outer diameter of 118.4 mm, and a height of 150.0 mm.

In the same manner as in Example 4, the section of the rubber tube was expanded and the rubber tube was set in the outer cylinder, and the folded portion was fixed to the outer cylinder with the metal band. The operation was in the same manner as in Example 4.

Using the holding device of the above-described size, articles having an outer diameter of from 100.0 to 140.0 mm and the outer wall were able to be held under the conditions where the outer wall was completely sealed.

We claim:
1. A liquid coating method for coating a liquid onto inner cells of a honeycomb structure, comprising the steps of:

supplying a liquid to an inside of a honeycomb structure vertically arranged from its lower part until the liquid surface completely reaches a position higher than the upper end surface of the honeycomb structure to cause the liquid to adhere to the inner cells; and supplying pressurized air onto an upper part of the honeycomb structure and letting the pressurized air out from an upper part of the honeycomb structure through its inner part to its lower part to discharge the liquid within the inner cells.

2. A liquid coating method as claimed in claim 1, further comprising the steps of:

providing a liquid storage tank for storing a liquid to be coated, the liquid storage tank having an upper opening at its upper part and an air discharge outlet, and an air duct having a lower opening at a lower part of the air duct;

connecting the upper opening of the liquid storage tank to a bottom of the honeycomb structure vertically arranged;

further connecting the lower opening of the air duct to a top of the honeycomb structure, and supplying the liquid to be coated from the liquid storage tank into the inner cells in the honeycomb structure to cause the liquid to adhere to the inner cells.

3. A method as claimed in claim 2, further comprising the steps of:

supplying pressurized air from the air duct to the upper part of the honeycomb structure; and discharging the pressurized air from the air discharge outlet of the liquid storage tank to discharge the liquid in the cell.

* * * * *